United States Patent
Rafferty et al.

(10) Patent No.: US 11,816,969 B2
(45) Date of Patent: Nov. 14, 2023

(54) DETECTION OF A THREAT IN A PHYSICAL ENVIRONMENT

(71) Applicant: Capital One Services, LLC, McLean, VA (US)

(72) Inventors: Galen Rafferty, Mahomet, IL (US); Austin Walters, Savoy, IL (US); Christopher Wallace, Rochester, NY (US); Samuel Sharpe, Cambridge, MA (US); Brian Barr, Schenectady, NY (US); Anh Truong, Champaign, IL (US); Grant Eden, Menlo Park, CA (US)

(73) Assignee: Capital One Services, LLC, McLean, VA (US)

( * ) Notice: Subject to any disclaimer, the term of this patent is extended or adjusted under 35 U.S.C. 154(b) by 113 days.

(21) Appl. No.: 17/453,409

(22) Filed: Nov. 3, 2021

(65) Prior Publication Data

US 2023/0136846 A1    May 4, 2023

(51) Int. Cl.
| | |
|---|---|
| *G08B 21/02* | (2006.01) |
| *G01W 1/02* | (2006.01) |
| *G06N 20/20* | (2019.01) |
| *G08B 7/06* | (2006.01) |
| *G06V 20/20* | (2022.01) |
| *G10L 15/22* | (2006.01) |

(52) U.S. Cl.
CPC .............. *G08B 21/02* (2013.01); *G01W 1/02* (2013.01); *G06N 20/20* (2019.01); *G06V 20/20* (2022.01); *G08B 7/06* (2013.01); *G10L 15/22* (2013.01)

(58) Field of Classification Search
CPC .......... G08B 21/02; G08B 7/06; G08B 31/00; G01W 1/02; G06N 20/20; G06N 20/00; G06V 20/20; G06V 20/52; G06V 10/95; G10L 15/22

See application file for complete search history.

(56) References Cited

U.S. PATENT DOCUMENTS

| | | | |
|---|---|---|---|
| 2020/0242360 A1 | 7/2020 | Alexander | |
| 2020/0379108 A1* | 12/2020 | Vijayalingam | ....... G06F 18/253 |
| 2023/0070772 A1* | 3/2023 | Bingham | ............. G08B 19/005 |

\* cited by examiner

*Primary Examiner* — Brian Wilson
(74) *Attorney, Agent, or Firm* — Harrity & Harrity, LLP (57) ABSTRACT

A user device may obtain sensor data related to a physical environment. The user device may process the sensor data to determine that a potential threat exists in the physical environment and a threat score associated with the potential threat. The user device may determine that the threat score satisfies a threat score threshold. The user device may obtain, based on determining that the threat score satisfies the threat score threshold, additional information related to the physical environment. The user device may generate, based on the additional information related to the physical environment and at least one of the sensor data, information indicating the potential threat in the physical environment, or the threat score associated with the potential threat, threat determination information associated with the physical environment. The user device may perform, based on the threat determination information associated with the physical environment, one or more actions.

20 Claims, 9 Drawing Sheets

DETECTION OF A THREAT IN A PHYSICAL ENVIRONMENT

BACKGROUND

A threat in a physical environment can pose a danger to a person, animal, or property within a vicinity of the physical environment. Often, it is difficult for a person to identify the threat, to determine a severity of harm associated with the threat, and/or to determine a likelihood of harm associated with the threat.

SUMMARY

Some implementations described herein relate to a user device. The user device may include one or more memories and one or more processors coupled to the one or more memories. The user device may be configured to obtain sensor data related to a physical environment. The user device may be configured to process the sensor data to determine that a potential threat exists in the physical environment and a threat score associated with the potential threat. The user device may be configured to determine that the threat score satisfies a threat score threshold. The user device may be configured to send, to another device and based on determining that the threat score satisfies the threat score threshold, the sensor data, information indicating the potential threat, and the threat score. The user device may be configured to receive, based on sending the sensor data, the information indicating the potential threat, and the threat score to the other device, threat determination information associated with the physical environment. The user device may be configured to perform, based on the threat determination information associated with the physical environment, one or more actions.

Some implementations described herein relate to a non-transitory computer-readable medium that stores a set of instructions for a server device. The set of instructions, when executed by one or more processors of the server device, may cause the server device to receive, from a user device, sensor data related to a physical environment, information indicating a potential threat in the physical environment, and a threat score associated with the potential threat. The set of instructions, when executed by one or more processors of the server device, may cause the server device to identify, based on the sensor data, a location associated with the physical environment. The set of instructions, when executed by one or more processors of the server device, may cause the server device to identify, based on the location associated with the physical environment, one or more other user devices. The set of instructions, when executed by one or more processors of the server device, may cause the server device to obtain, based on identifying the one or more other user devices, additional information related to the physical environment that was obtained by the one or more other user devices. The set of instructions, when executed by one or more processors of the server device, may cause the server device to generate, based on the additional information related to the physical environment and at least one of the sensor data related to the physical environment, the information indicating the potential threat in the physical environment, or the threat score associated with the potential threat, threat determination information associated with the physical environment. The set of instructions, when executed by one or more processors of the server device, may cause the server device to cause, based on the threat determination information associated with the physical environment, one or more actions to be performed.

Some implementations described herein relate to a method of determining whether an actual threat exists in a physical environment. The method may include obtaining, by a user device, sensor data related to the physical environment. The method may include processing, by the user device, the sensor data to determine that a potential threat exists in the physical environment and a threat score associated with the potential threat. The method may include determining, by the user device, that the threat score satisfies a threat score threshold. The method may include obtaining, by the user device and based on determining that the threat score satisfies the threat score threshold, additional information related to the physical environment. The method may include generating, based on the additional information related to the physical environment and at least one of the sensor data, information indicating the potential threat in the physical environment, or the threat score associated with the potential threat, threat determination information associated with the physical environment. The method may include performing, based on the threat determination information associated with the physical environment, one or more actions.

DETAILED DESCRIPTION

The following detailed description of example implementations refers to the accompanying drawings. The same reference numbers in different drawings may identify the same or similar elements.

A user device can utilize one or more object detection techniques to identify one or more objects that are depicted in a set of images (e.g., that are captured by at least one camera of the user device), and, in some cases, identify and/or classify the one or more objects. This can be useful to identify hazardous objects that are depicted in the set of images, which enables the user device to display information (e.g., warnings or alerts) regarding the hazardous objects on a display of the user device. Additionally, the user device can communicate with a server device to allow the server device to facilitate processing of the set of images to identify the hazardous objects. However, in many cases, the user device and/or the server device can misidentify an object as a hazardous object (e.g., because of a limited number of images depicting the object in the set of images, a limited view of the object in the set of images, and/or a peculiar viewing angle of the object in the set of images, among other examples). This can lead to a wasteful use of computing resources (e.g., processing resources, memory resources, communication resources, and/or power resources, among other examples) of the user device to display incorrect information regarding the object (e.g., displaying an alert that the object is hazardous when the object is not hazardous) and/or wasteful use of computing resources of the user device and/or the server device to communicate with other devices (e.g., other user devices) to transmit the incorrect information (e.g., to incorrectly provide warnings to the other user devices about the object).

Some implementations described herein provide a user device that obtains sensor data (e.g., image data, video data, audio data, and/or location) related to a physical environment (e.g., the physical environment around the user device). The user device processes the sensor data to determine whether a potential threat exists in the physical environment (e.g., a fire, a dangerous substance, and/or a dangerous storm, among other examples) and a threat score associated with the potential threat. If the user device determines that the threat score satisfies a threat score threshold (e.g., indicating that identification of the potential threat is likely accurate, a severity of harm associated with the potential threat is significant, and/or that the harm associated with the potential threat is likely to occur), the user device may send the sensor data, information identifying the potential threat, and the threat score to a server device. Accordingly, the server device may obtain additional information related to the physical environment (e.g., sensor data obtained by other user devices) and may determine whether an actual threat exists in the physical environment. The server device may send threat determination information (e.g., that includes information related to determination of the actual threat) to the user device to cause the user device to display the information (e.g., as an alert to find shelter because of an actual threat of a dangerous storm) and/or to cause an emergency response to be dispatched at the physical environment (e.g., to cause police, firefighters, and/or medics, among other examples, to be sent to the physical environment; and/or, to cause a sprinkler, a siren, and/or warning lights, among other examples, to be activated at the physical environment).

In this way, some implementations described herein enable detection of a threat in a physical environment. Further, because the user device communicates with the server device only after determining that the threat score associated with the potential threat satisfies the threat score threshold, some implementations reduce utilization of computing resources (e.g., processing resources, memory resources, communication resources, and/or power resources, among other examples) of the user device and/or the server device that would otherwise be used to determine that a potential threat is not an actual threat or to determine that a potential threat is a non-serious actual threat (e.g., a severity of harm associated with the actual threat is insignificant and/or that the harm associated with the potential threat is not likely to occur). Moreover, some implementations described herein improve a likelihood of accurate display of actual threat information (e.g., of alerts, notifications, and/or other information) associated with the physical environment and/or correct dispatch of an emergency response at the physical environment. This conserves computing resources that would otherwise be used to display inaccurate threat information and/or to incorrectly dispatch an emergency response. This, in turn, prevents alert fatigue (e.g., that results from inaccurate threat determinations) of the user or an emergency responder, which increases a likelihood that the user and/or emergency responder will take measures to avoid harm and/or to address the threat.

FIGS. 1A-1D are diagrams of an example 100 associated with detection of a threat in a physical environment. As shown in FIGS. 1A-1D, example 100 includes a user device, a server device, and a host platform. These devices are described in more detail in connection with FIGS. 3 and 4.

Figure 1A:
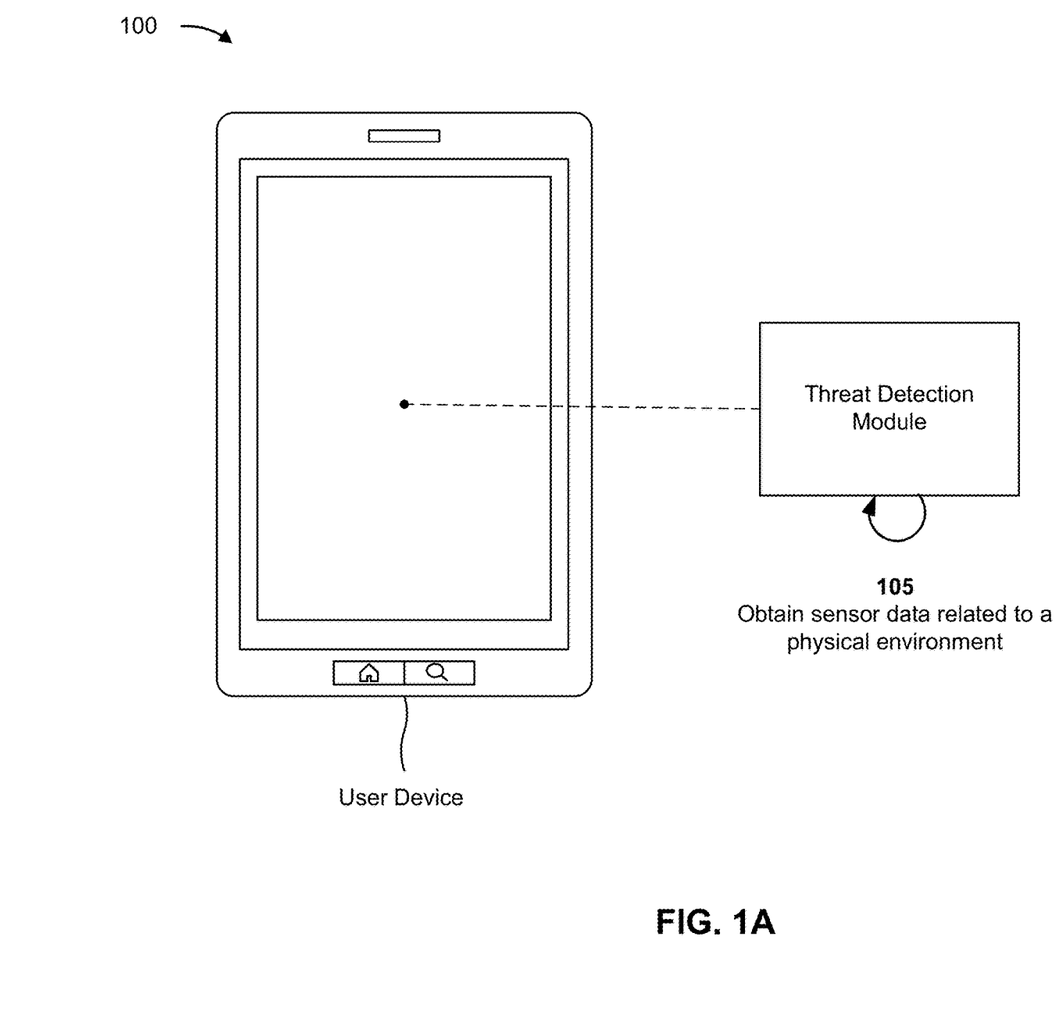
FIGS. 1A-1D are diagrams of an example implementation relating to detection of a threat in a physical environment.

As shown in FIG. 1A, the user device may include a threat detection module (or another similar module or component). As shown by reference number 105, the user device, when using the threat detection module (e.g., that is used when running a threat detection application), may obtain sensor data related to a physical environment. For example, the user device may obtain image data associated with the physical environment (e.g., from one or more cameras of the user device and/or at least one other image sensing device included in or connected to the user device), video data associated with the physical environment (e.g., from the one or more cameras or the at least one other image sensing device), audio data associated with the physical environment (e.g., from one or more microphones of the user device and/or at least one other audio sensing device included in or connected to the user device), location data associated with the physical environment (e.g., from a global positioning system (GPS) device of the user device and/or at least one other location sensing device included in or connected to the user device), temperature data associated with the physical environment (e.g., from a thermometer device of the user device and/or at least one other temperature sensing device included in or connected to the user device), humidity data associated with the physical environment (e.g., from a humidistat device of the user device and/or at least one other humidity sensing device included in or connected to the user device), atmospheric pressure data associated with the physical environment (e.g., from a barometer device of the user device and/or at least one other atmospheric pressure sensing device included in or connected to the user device), and/or orientation data associated with the user device (e.g., from an accelerometer device of the user device and/or at least one other orientation sensing device included in or connected to the user device), among other examples. The user device may obtain the sensor data when the user device is located within an area or boundary associated with the physical environment. For example, when the physical environment is a room of a building, the user device may obtain the sensor data when the user device is located within the room of the building. As another example, when the physical environment is a location on a street (e.g., at an address of a physical property), the user device may obtain the sensor data when the user device is within a particular radius (e.g., 100 feet, 500 feet, or 1000 feet, among other examples) of the location on the street.

Figure 1B:
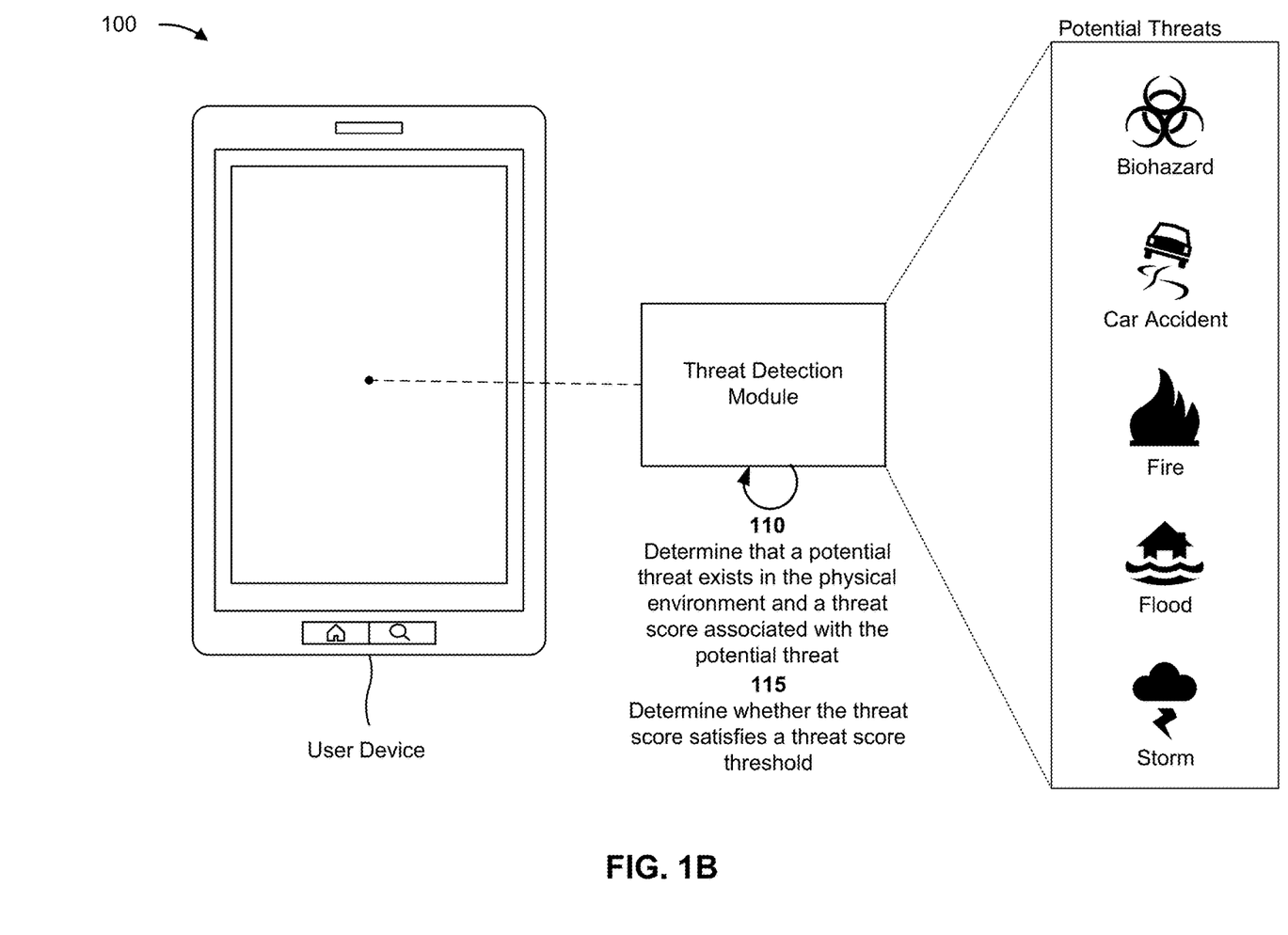

As shown in FIG. 1B and by reference number 110, the user device (e.g., when using the threat detection module) may determine that a potential threat exists in the physical environment. A potential threat includes, for example, a biohazard threat, a car accident threat, a fire threat, a flood threat, a storm threat, and/or any other type of threat that has a potential to harm a person and/or an animal, and/or to damage property. The user device may process the sensor data to determine that the potential threat exists in the physical environment. For example, when the sensor data includes image data and/or video data, the user device may process the sensor data (e.g., using an image processing technique and/or a video processing technique, such as an object detection and/or identification technique) to identify a potential threat that is depicted in an image or video segment of the sensor data. As another example, when the sensor data includes audio data, the user device may process the sensor data (e.g., using an audio processing technique, such as a speech recognition technique) to identify a potential threat that is audibly presented in the sensor data. In an additional example, when the sensor data includes location data, the user device may process the location data (e.g., using a location data processing technique, such as a location detection technique) to identify a potential threat based on one or more locations included in the sensor data.

In some implementations, the user device may use a machine learning model to determine that the potential threat exists in the physical environment. For example, the user device may process, using the machine learning model, the sensor data to identify the potential threat in the physical environment. In some implementations, the user device may train the machine learning model based on historical sensor data (e.g., sensor data that was previously captured by the user device and/or one or more other user devices) and/or additional information, such as indications of one or more physical environments and/or indications of one or more potential threats in the one or more physical environments. Using the historical sensor data and/or the additional information as inputs to the machine learning model, the user device may train the machine learning model to identify one or more potential threats in a physical environment. In some implementations, the machine learning model may be trained and/or used in a manner similar to that described below with respect to FIG. 2.

As further shown by reference number 110, the user device may determine a threat score associated with the potential threat. The threat score may be a numerical value, such as a value between 0 and 10 (e.g., greater than or equal to 0 and less than or equal to 10), and may indicate (e.g., may be a numerical representation of) a likelihood (e.g., in terms of a percentage) of an accurate determination (e.g., by the user device) that the potential threat exists in the physical environment, a severity of harm associated with the potential threat in the physical environment (e.g., within a range of 0 (not severe), to 10 (extremely severe)), and/or a likelihood (e.g., in terms of a percentage) of the harm associated with the potential threat in the physical environment. For example, the threat score may be a mathematical product of the likelihood of an accurate determination that the potential threat exists in the physical environment, the severity of harm associated with the potential threat in the physical environment, and/or the likelihood of the harm associated with the potential threat in the physical environment.

In some implementations, the user device may use a machine learning model to determine the threat score associated with the potential threat. The machine learning model may be the same machine learning model described above (e.g., a "first" machine learning model) or a different machine learning model (e.g., a "second" machine learning model). For example, the user device may process, using the machine learning model, the sensor data and/or the determination (e.g., by the user device, as described above) that a potential threat exists in the physical environment. In some implementations, the user device may train the machine learning model based on historical sensor data (e.g., sensor data that was previously captured by the user device and/or one or more other user devices), historical determinations that potential threats exist in a physical environment, and/or additional information, such as indications of threat scores associated with the potential threats. Using the historical sensor data, the historical determinations, and/or the additional information as inputs to the machine learning model, the user device may train the machine learning model to determine a threat score associated with a potential threat identified in a physical environment. In some implementations, the machine learning model may be trained and/or used in a manner similar to that described below with respect to FIG. 2.

As shown in FIG. 1B and by reference number 115, the user device, when using the threat detection module, may determine that the threat score satisfies a threat score threshold. For example, the user device may determine that the threat score is greater than or equal to the threat score threshold. The threat score threshold may be a numerical value and may indicate (e.g., may be a numerical representation of) a likelihood threshold (e.g., in terms of a percentage) of an accurate determination (e.g., by the user device) that a potential threat exists in the physical environment, a severity of harm threshold associated with the potential threat in the physical environment (e.g., within a range of 0 (not severe), to 10 (extremely severe)), and/or a likelihood threshold (e.g., in terms of a percentage) of the harm associated with a potential threat in the physical environment. For example, the threat score threshold may be a mathematical product of the likelihood threshold that a potential threat exists in the physical environment, the severity of harm threshold associated with the potential threat in the physical environment, and/or the likelihood threshold of the harm associated with the potential threat in the physical environment.

Figure 1C:
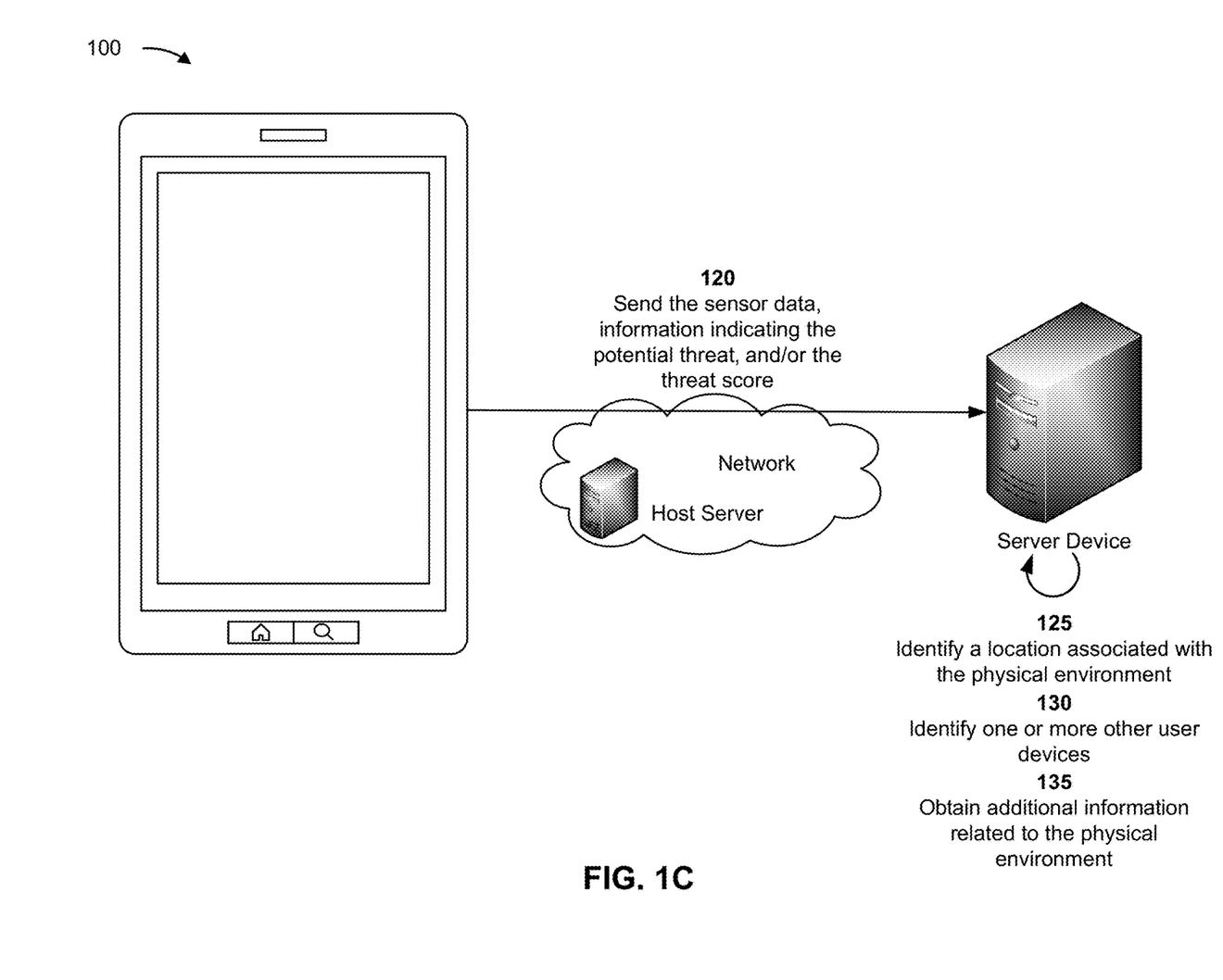

As shown in FIG. 1C, and by reference number 120, the user device may send the sensor data, information indicating the potential threat, and the threat score to the server device. For example, the user device may send the sensor data, the information indicating the potential threat, and the threat score to a host server of a network, which may send the request to the server device.

As shown by reference number 125, the server device may identify a location associated with the physical environment (e.g., based on the sensor data). For example, when the sensor data includes location data associated with the physical environment, the server device may process (e.g., parse) the location data included in sensor data to identify the location associated with the physical environment. As another example, when the sensor data does not include location data associated with the physical environment, the sensor data may process the sensor data (e.g., that includes image data, video data, and/or audio data, among other examples) to determine one or more location identifiers, such as one or more depictions of a building associated with the physical environment that are included in the image data and/or the video data and/or one or more audible loudspeaker messages associated with the physical environment that are presented in the audio data. The server device may identify a data structure (e.g., a database, a table, and/or an electronic file, among other examples) that stores and/or maintains physical environment location information and may identify, based on the one or more location identifiers, an entry in the data structure that is associated with the physical environment. The user device may process (e.g., parse) the entry to identify the location associated with the physical environment.

As shown by reference number 130, the server device may identify one or more other user devices (e.g., based on the location associated with the physical environment). The one or more other user devices may be, or may have been (e.g., within a time threshold, such as within 1 minute, 5 minutes, or 1 hour, prior to obtainment of the sensor data by the user device), located at the location associated with the physical environment (or located within a threshold distance, such as 500 feet, of the location associated with the physical environment). For example, the server device may identify a data structure that stores and/or maintains user device location information (e.g., that indicates respective locations of a plurality of user devices). The server device may identify, based on the location associated with the physical environment, one or more entries in the data structure that are associated with the one or more user devices, of the plurality of user devices, and may process (e.g., parse) the one or more entries to identify the one or more other user devices.

As shown by reference number 135, the server device may obtain additional information related to the physical environment. The additional information may include, for example, other sensor data related to the physical environment that is obtained by the one or more other user devices, other information indicating the potential threat in the physical environment that is determined by the one or more other user devices, and/or one or more other threat scores associated with the potential threat that are determined by the one or more other user devices. For example, each of the one or more other user devices may obtain particular sensor data, determine that the potential threat exists in the physical environment, and determine a particular threat score, and may send the particular sensor data, particular information indicating the potential threat in the physical environment, and/or a particular threat score associated with the potential threat to the server device (e.g., in a similar manner as that described herein in relation to FIGS. 1A-1C and reference numbers 105-120). Additionally, or alternatively, the server device may send, to each user device, of the one or more other user devices, a request (e.g., a request for additional information related to the physical environment). Accordingly, the user device may receive (e.g., based on sending the request), from at least one of the one or more other user devices, one or more responses (e.g., that includes the additional information related to the physical environment) and may process (e.g., parse) the one or more responses to determine the additional information related to the physical environment. In this way, the server device may directly obtain the additional information from the one or more other user devices.

In some implementations, the server device may indirectly obtain the additional information from the one or more other user devices. For example, the user device may identify a data structure that stores user device physical environment information (e.g., information associated with physical environments that is captured by and/or generated by user devices). The server device may identify, based on the location associated with the physical environment and/or identifying the one or more other user devices, one or more entries in the data structure that are associated with the one or more user devices and may process (e.g., parse) the one or more entries to obtain the additional information related to the physical environment.

Figure 1D:
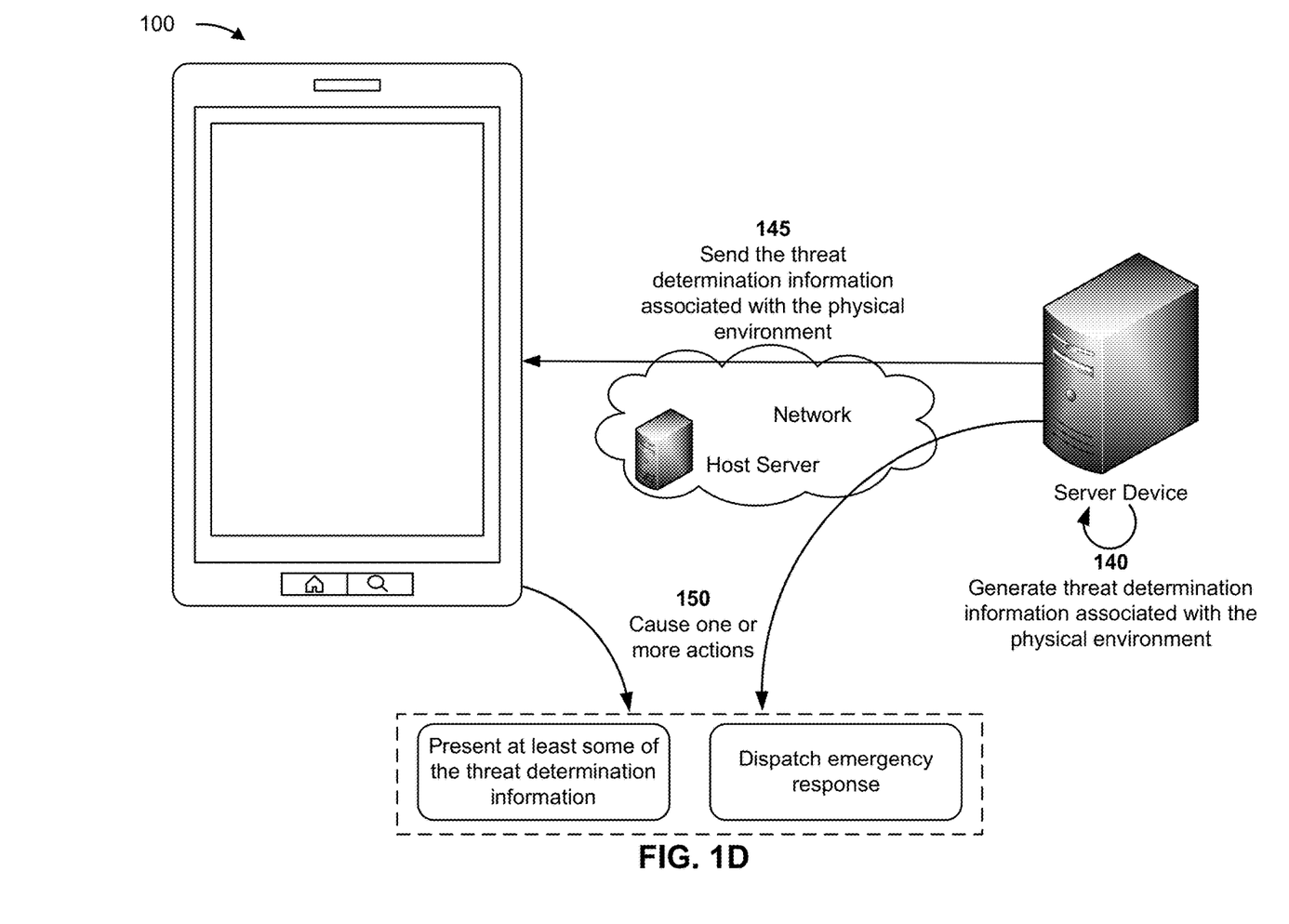

As shown in FIG. 1D, and by reference number 140, the server device may generate threat determination information associated with the physical environment (e.g., based on the additional information related to the physical environment that was obtained by the server device from the one or more other user devices and at least one of the sensor data related to the physical environment, the information indicating the potential threat in the physical environment, or the threat score associated with the potential threat that was obtained by the server device from the user device). The threat determination information associated with the physical environment may indicate, for example, a determination (e.g., a positive determination or a negative determination) of whether an actual threat exists in the physical environment, a likelihood (e.g., in terms of percentage) of an accurate determination of whether the actual threat exists in the physical environment; a severity of harm associated with the actual threat in the physical environment (e.g., within a range of 0 (not severe), to 10 (extremely severe)), and/or a likelihood (e.g., in terms of a percentage) of the harm associated with the actual threat in the physical environment.

For example, the server device may identify, based on the additional information related to the physical environment (e.g., that was provided by the one or more other user devices), one or more additional threat scores associated with the potential threat. The user device may process the threat score associated with the potential threat (e.g., that the server device received from the user device) and the one or more additional threat scores associated with the potential threat to generate the threat determination information associated with the physical environment. The user device, for example, may combine (e.g., average) the threat score and the one or more additional threat scores to determine a threat score associated with an actual threat in the physical environment and may generate the threat determination information associated with the physical environment to include the threat score associated with the actual threat in the physical environment.

As another example, the server device may process (e.g., parse) the additional information related to the physical environment (e.g., that was obtained by the one or more other user devices) to identify the additional sensor data related to the physical environment (e.g., that is included in the additional information related to the physical environment). The server device may process (e.g., using the first machine learning model, described elsewhere herein) the sensor data (e.g., that the server device received from the user device) and the additional sensor data to determine whether an actual threat exists in the physical environment. Additionally, or alternatively, the server device may process (e.g., using the second machine learning model, described elsewhere herein) the sensor data, the additional sensor data, and/or the determination of whether the actual threat exists in the physical environment, to determine a threat score associated with the actual threat in the physical environment. The server device may generate the threat determination information associated with the physical environment to include the determination of whether the actual threat exists in the physical environment and/or the threat score associated with the actual threat in the physical environment.

As shown by reference number 145, the server device may send the threat determination information associated with the physical environment to the user device. For example, the server device may send the threat determination information associated with the physical environment to the host server of the network, which may send the threat determination information associated with the physical environment to the user device.

As shown by reference number 150, the user device and/or the server device may perform one or more actions or may cause the one or more actions to be performed (e.g., based on the threat determination information associated with the physical environment). In some implementations, the one or more actions may include presenting at least some of the threat determination information. For example, the user device may display at least a portion of the threat determination information associated with the physical environment on a display of the user device, present at least a portion of the threat determination information associated with the physical environment via a speaker of the user device, and/or provide a haptic signal that indicates at least a portion of the threat determination information associated with the physical environment via a haptic device of the user device. As another example, the server device may send, to the user device and the one or more other user devices (e.g., that provided the additional information related to the physical environment) the threat determination information associated with the physical environment to cause at least some of the threat determination information associated with the physical environment to be presented by the user device and/or the one or more other user devices.

In some implementations, the one or more actions include dispatching an emergency response (e.g., to address an actual threat identified by the threat determination information associated with the physical environment). For example, the user device and/or the server device may send, to an emergency response device (e.g., a user device of an emergency response provider, such as a user device of a police department, of a fire department, and/or of a hospital, among other examples), the threat determination information associated with the physical environment to cause dispatch of an emergency response (e.g., dispatch of a police officer, a firefighter, and/or a medic, among other examples) at the physical environment. In some implementations, the emergency response device may be configured to perform the emergency response. For example, the emergency response device may be a sprinkler associated with the physical environment and may be configured to activate (e.g., to turn on to allow water to emit from the sprinkler) upon receiving the threat determination information. As another example, the emergency response device may be an alarm system (e.g., a fire alarm system, a storm alarm system, or another type of alarm system) associated with the physical environment and may be configured to activate (e.g., to turn on to provide a message via the alarm system) upon receiving the threat determination information. As another example, the emergency response device may be a robot, a drone, or another mobile device associated with the physical environment and may be configured to go to the location of the physical environment (e.g., to provide an emergency response at the physical environment) upon receiving the threat determination information.

As indicated above, FIGS. 1A-1D are provided as an example. In practice, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of one or more examples 100 may perform one or more functions described as being performed by another set of devices of one or more examples 100. For example, the user device may perform one or more functions described as being performed by the server device, or vice versa.

Figure 2:
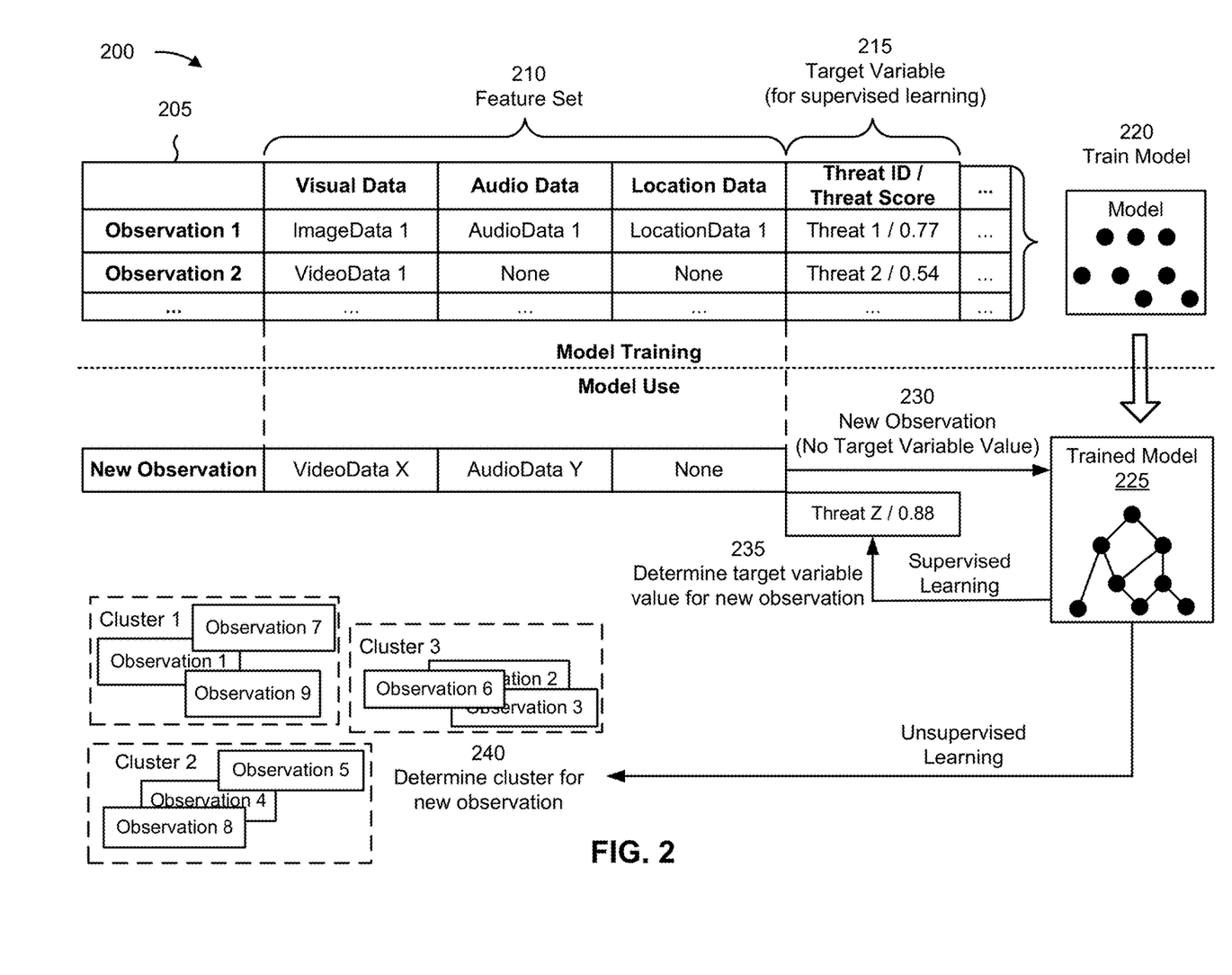
FIG. 2 is a diagram illustrating an example of training and using a machine learning model in connection with detection of a threat in a physical environment.

FIG. 2 is a diagram illustrating an example 200 of training and using a machine learning model in connection with detection of a threat in a physical environment. The machine learning model training and usage described herein may be performed using a machine learning system. The machine learning system may include or may be included in a computing device, a server, a cloud computing environment, or the like, such as the server device and/or the user device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the server device and/or the user device, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the server device and/or the user device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of Visual Data, a second feature of Audio Data, a third feature of Location Data, and so on. As shown, for a first observation, the first feature may have a value of ImageData 1, the second feature may have a value of AudioData 1, the third feature may have a value of LocationData 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is Threat ID/Threat Score, which has a value of Threat 1/0.77 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of VideoData X, a second feature of AudioData Y, a third feature of None, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of Threat Z/0.88 for the target variable of Threat ID/Threat Score for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to provide the Threat ID and/or the Threat Score to one or more user devices. The first automated action may include, for example, dispatch of an emergency response.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a Threat ID classification group and/or a Threat Score group), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to detection of a threat in a physical environment. The machine learning system enables recognition and/or identification of tens, hundreds, thousands, or millions of features and/or feature values for tens, hundreds, thousands, or millions of observations, thereby increasing accuracy and consistency and reducing delay associated with detection of a threat in a physical environment relative to requiring computing resources to be allocated for tens, hundreds, or thousands of operators to manually detect a threat in a physical environment using the features or feature values.

As indicated above, FIG. 2 is provided as an example. Other examples may differ from what is described in connection with FIG. 2.

Figure 3:
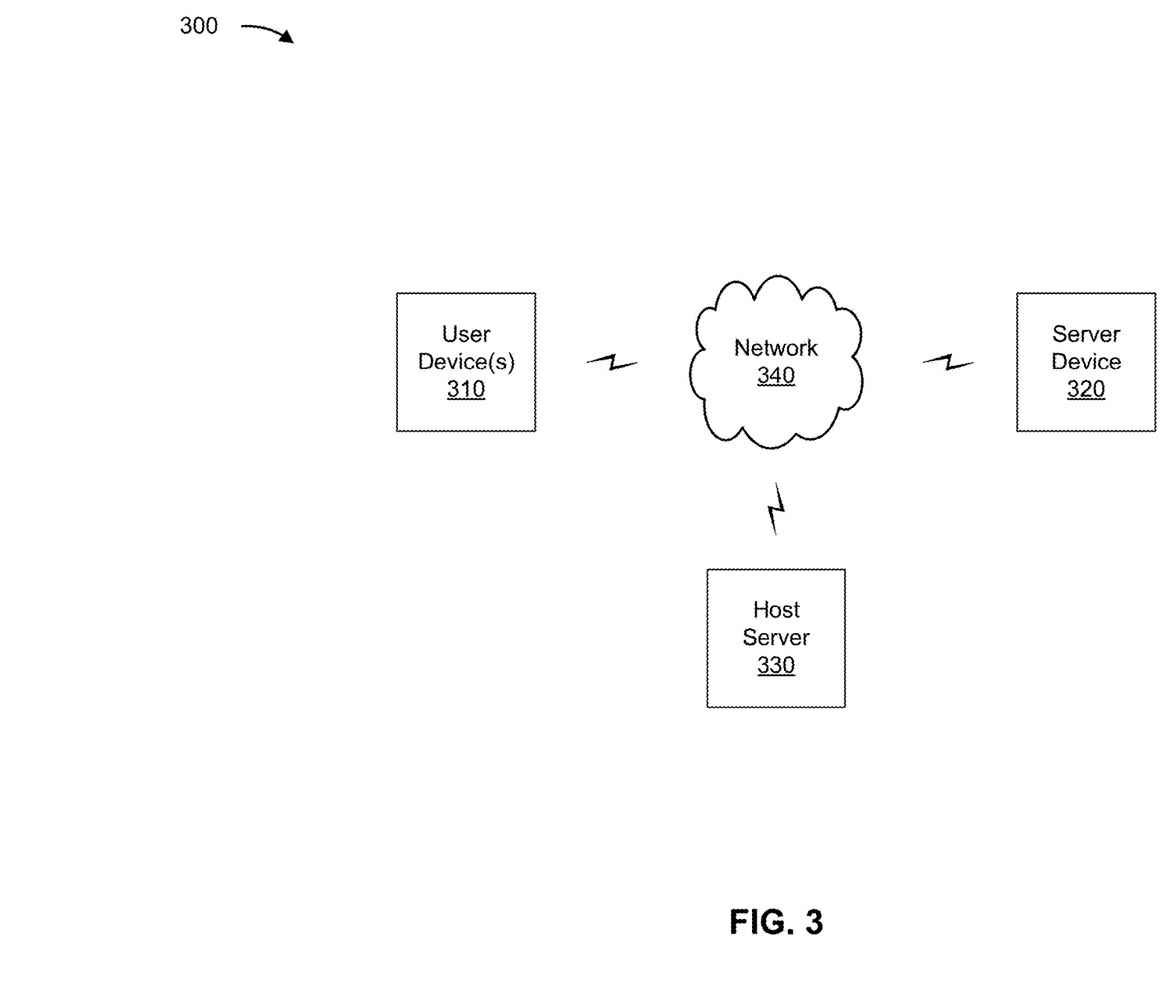
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a user device 310, a server device 320, a host platform 330, and a network 340. Devices of environment 300 may interconnect via wired connections, wireless connections, or a combination of wired and wireless connections.

The user device 310 includes one or more devices capable of receiving, generating, storing, processing, and/or providing information associated with detection of a threat in a physical environment, as described elsewhere herein. The user device 310 may include a communication device and/or a computing device. For example, the user device 310 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The server device 320 includes one or more devices capable of receiving, generating, storing, processing, providing, and/or routing information associated with detection of a threat in a physical environment, as described elsewhere herein. The server device 320 may include a communication device and/or a computing device. For example, the server device 320 may include a server, such as an application server, a client server, a web server, a database server, a host server, a proxy server, a virtual server (e.g., executing on computing hardware), or a server in a cloud computing system. In some implementations, the server device 320 includes computing hardware used in a cloud computing environment.

The host platform 330 includes one or more devices capable of receiving, generating, storing, processing, providing, and/or routing information associated with tokenizing authentication information, as described elsewhere herein. The host platform 330 may include a communication device and/or a computing device, such as a server device. For example, the host platform 330 may include a server, such as an application server, a web server, a proxy server, a virtual server (e.g., executing on computing hardware), or a server in a cloud computing system. In some implementations, the host platform 330 includes computing hardware used in a cloud computing environment. In some implementations, the server device 320 is implemented on and integrated with the host platform 330 (e.g., to grant or deny access to resources hosted or served by the host platform 330).

The network 340 includes one or more wired and/or wireless networks. For example, the network 340 may include a cellular network, a public land mobile network, a local area network, a wide area network, a metropolitan area network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
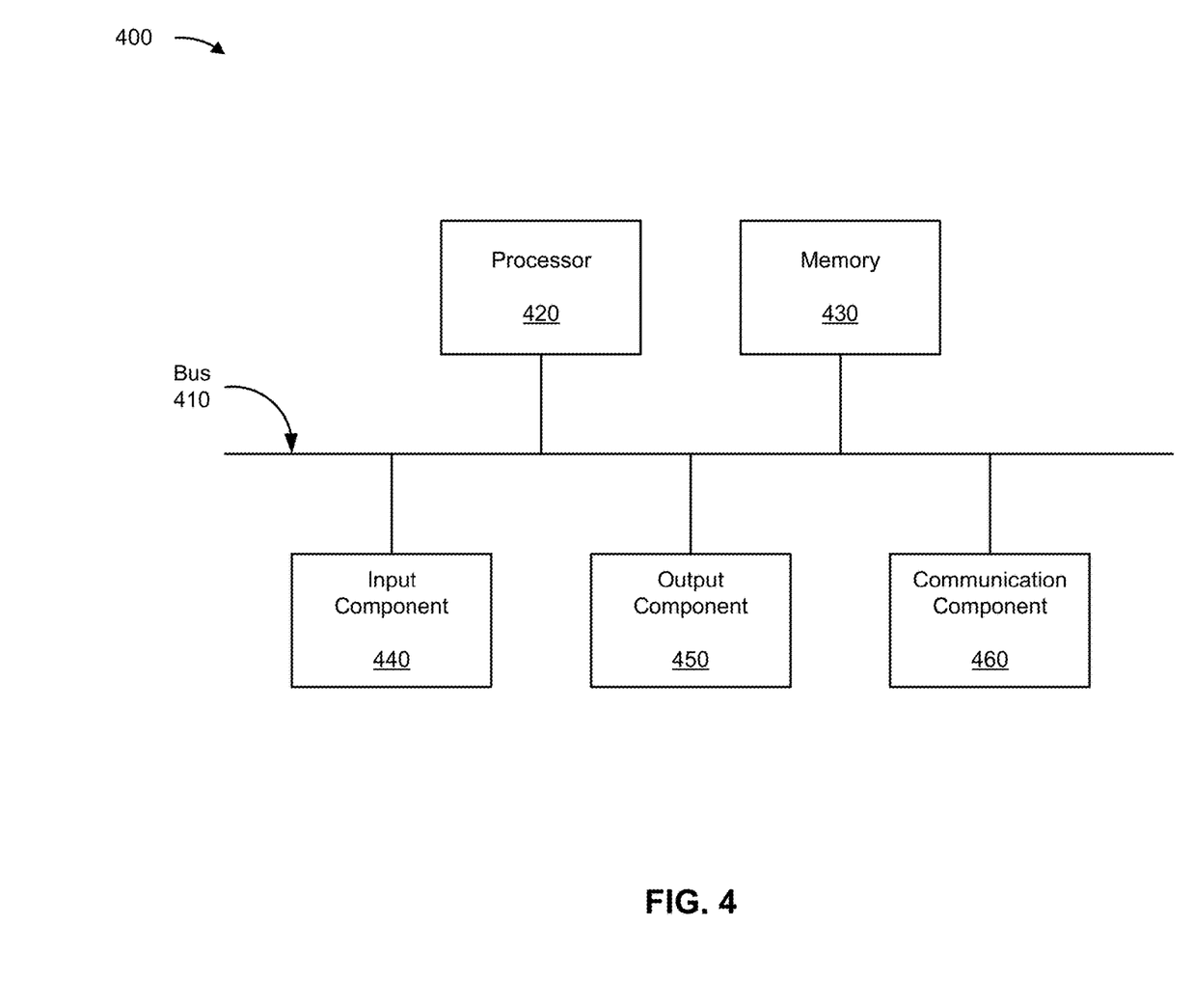
FIG. 4 is a diagram of example components of one or more devices of FIG. 3.

FIG. 4 is a diagram of example components of a device 400, which may correspond to the user device 310, the server device 320, and/or the host platform 330. In some implementations, the user device 310, the server device 320, and/or the host platform 330 may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
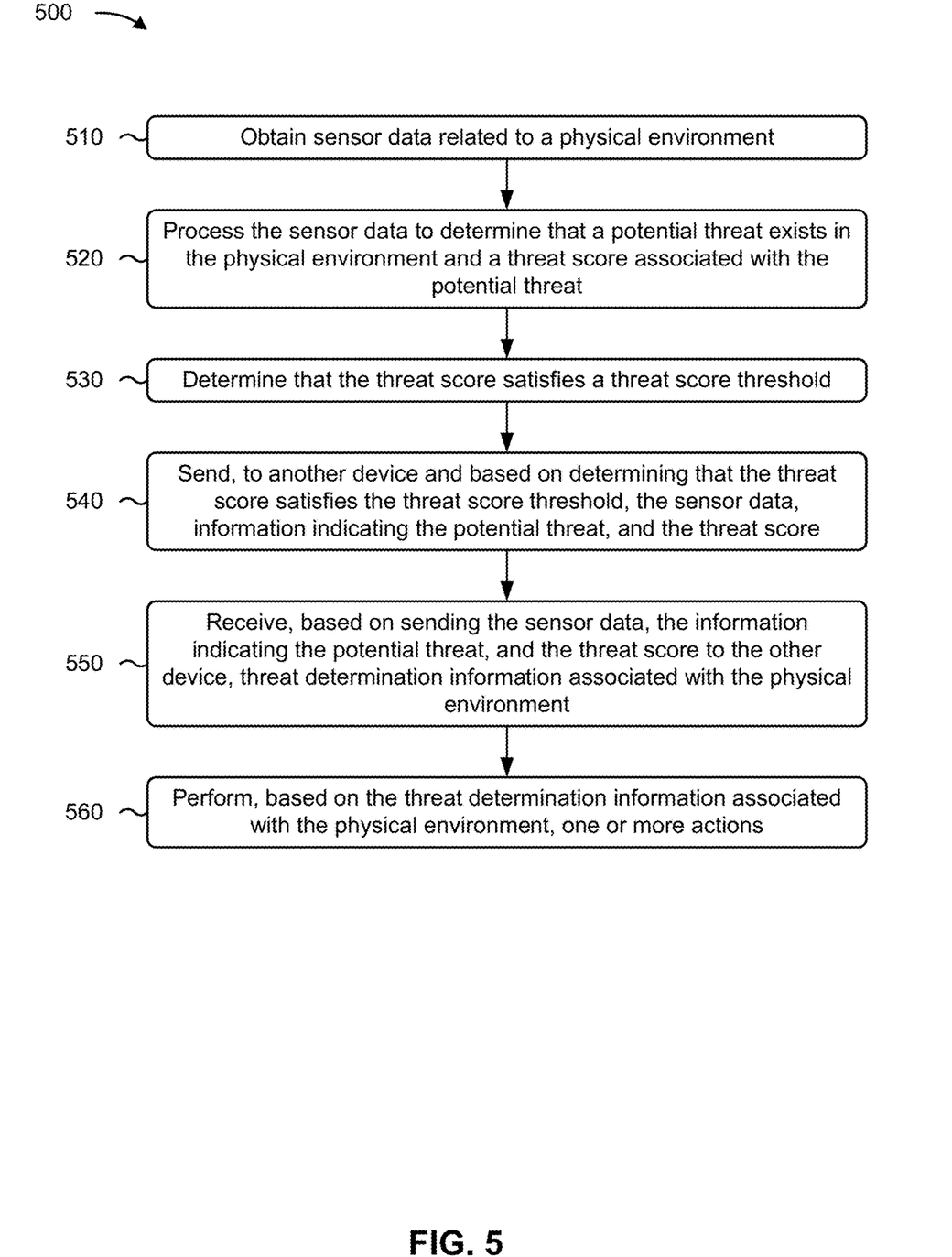
FIGS. 5-6 are flowcharts of example processes relating to detecting a threat in a physical environment.

FIG. 5 is a flowchart of an example process 500 associated with detection of a threat in a physical environment. In some implementations, one or more process blocks of FIG. 5 may be performed by a user device (e.g., user device 310). In some implementations, one or more process blocks of FIG. 5 may be performed by another device or a group of devices separate from or including the user device, such as such as a server device (e.g., server device 320) and/or a host server (e.g., host server 330). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include obtaining sensor data related to a physical environment (block 510). As further shown in FIG. 5, process 500 may include processing the sensor data to determine that a potential threat exists in the physical environment and a threat score associated with the potential threat (block 520). As further shown in FIG. 5, process 500 may include determining that the threat score satisfies a threat score threshold (block 530). As further shown in FIG. 5, process 500 may include sending, to another device and based on determining that the threat score satisfies the threat score threshold, the sensor data, information indicating the potential threat, and the threat score (block 540). As further shown in FIG. 5, process 500 may include receiving, based on sending the sensor data, the information indicating the potential threat, and the threat score to the other device, threat determination information associated with the physical environment (block 550). As further shown in FIG. 5, process 500 may include performing, based on the threat determination information associated with the physical environment, one or more actions (block 560).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
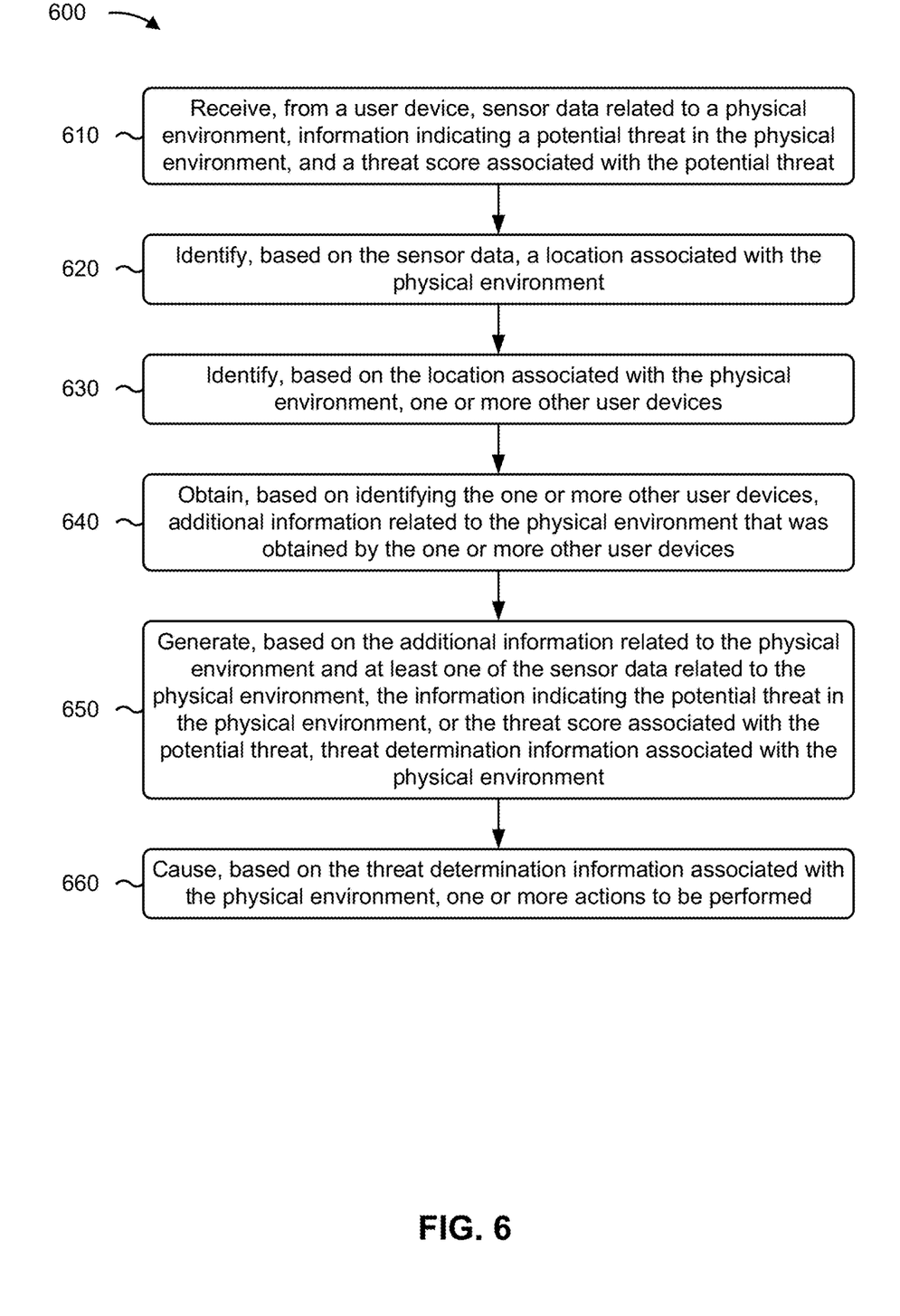

FIG. 6 is a flowchart of an example process 600 associated with detection of a threat in a physical environment. In some implementations, one or more process blocks of FIG. 6 may be performed by a server device (e.g., server device 320). In some implementations, one or more process blocks of FIG. 6 may be performed by another device or a group of devices separate from or including the user device, such as such as a user device (e.g., user device 310) and/or a host server (e.g., host server 330). Additionally, or alternatively, one or more process blocks of FIG. 6 may be performed by one or more components of device 400, such as processor 420, memory 430, input component 440, output component 450, and/or communication component 460.

As shown in FIG. 6, process 600 may include receiving, from a user device, sensor data related to a physical environment, information indicating a potential threat in the physical environment, and a threat score associated with the potential threat (block 610). As further shown in FIG. 6, process 600 may include identifying, based on the sensor data, a location associated with the physical environment (block 620). As further shown in FIG. 6, process 600 may include identifying, based on the location associated with the physical environment, one or more other user devices (block 630). As further shown in FIG. 6, process 600 may include obtaining, based on identifying the one or more other user devices, additional information related to the physical environment that was obtained by the one or more other user devices (block 640). As further shown in FIG. 6, process 600 may include generating, based on the additional information related to the physical environment and at least one of the sensor data related to the physical environment, the information indicating the potential threat in the physical environment, or the threat score associated with the potential threat, threat determination information associated with the physical environment (block 650). As further shown in FIG. 6, process 600 may include causing, based on the threat determination information associated with the physical environment, one or more actions to be performed (block 660).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user device, comprising:
   one or more memories; and
   one or more processors, coupled to the one or more memories, configured to:
   obtain sensor data related to a physical environment;
   process the sensor data to determine that a potential threat exists in the physical environment and determine a threat score associated with the potential threat, wherein the threat score indicates a combination of a likelihood that the potential threat exists, a severity of harm associated with the potential threat, and a likelihood of harm associated with the potential threat;
   determine that the threat score satisfies a threat score threshold;
   send, to another device and based on determining that the threat score satisfies the threat score threshold, the sensor data, information indicating the potential threat, and the threat score;
   receive, based on sending the sensor data, the information indicating the potential threat, and the threat score to the other device, threat determination information associated with the physical environment; and
   perform, based on the threat determination information associated with the physical environment, one or more actions.

2. The user device of claim 1, wherein the sensor data comprises at least one of:
- image data associated with the physical environment;
- video data associated with the physical environment;
- audio data associated with the physical environment;
- location data associated with the physical environment;
- temperature data associated with the physical environment;
- humidity data associated with the physical environment;
- atmospheric pressure data associated with the physical environment; or
- orientation data associated with the user device.

3. The user device of claim 1, wherein the one or more processors, to process the sensor data to determine that the potential threat exists in the physical environment and the threat score associated with the potential threat, are configured to:
- process, using a first machine learning model, the sensor data to identify the potential threat in the physical environment; and
- process, using a second machine learning model and based on identifying the potential threat in the physical environment, the sensor data to determine the threat score associated with the potential threat.

4. The user device of claim 1, wherein
the likelihood that the potential threat exists is a likelihood of an accurate determination that the potential threat exists in the physical environment.

5. The user device of claim 1, wherein the threat determination information associated with the physical environment indicates at least one of:
- a determination of whether an actual threat exists in the physical environment;
- a likelihood of an accurate determination of whether the actual threat exists in the physical environment;
- a severity of harm associated with the actual threat in the physical environment; or
- a likelihood of the harm associated with the actual threat in the physical environment.

6. The user device of claim 1, wherein the threat determination information associated with the potential threat is based on additional sensor data provided by one or more other user devices.

7. The user device of claim 1, wherein the one or more processors, to perform one or more actions, are configured to at least one of:
- display at least a portion of the threat determination information associated with the physical environment on a display of the user device;
- present at least a portion of the threat determination information associated with the physical environment via a speaker of the user device; or
- provide a haptic signal that indicates at least a portion of the threat determination information associated with the physical environment via a haptic device of the user device.

8. A non-transitory computer-readable medium storing a set of instructions, the set of instructions comprising:
- one or more instructions that, when executed by one or more processors of a server device, cause the server device to:
  - receive, from a user device, sensor data related to a physical environment, information indicating a potential threat in the physical environment, and a threat score associated with the potential threat, wherein the threat score indicates a combination of a likelihood that the potential threat exists, a severity of harm associated with the potential threat, and a likelihood of harm associated with the potential threat;
  - identify, based on the sensor data, a location associated with the physical environment;
  - identify, based on the location associated with the physical environment, one or more other user devices;
  - obtain, based on identifying the one or more other user devices, additional information related to the physical environment that was obtained by the one or more other user devices;
  - generate, based on the additional information related to the physical environment and at least one of the sensor data related to the physical environment, the information indicating the potential threat in the physical environment, or the threat score associated with the potential threat, threat determination information associated with the physical environment; and
  - cause, based on the threat determination information associated with the physical environment, one or more actions to be performed.

9. The non-transitory computer-readable medium of claim 8, wherein the additional information related to the physical environment comprises at least one of:
- other sensor data related to the physical environment that is obtained by the one or more other user devices,
- other information indicating the potential threat in the physical environment that is determined by the one or more other user devices, or
- one or more other threat scores associated with the potential threat that are determined by the one or more other user devices.

10. The non-transitory computer-readable medium of claim 8, wherein the one or more instructions, that cause the server device to obtain the additional information related to the physical environment, cause the server device to:
- identify a data structure that stores user device physical environment information;
- identify, based on the location associated with the physical environment, one or more entries in the data structure that are associated with the one or more user devices; and
- obtain the additional information related to the physical environment from the one or more entries.

11. The non-transitory computer-readable medium of claim 8, wherein the one or more instructions, that cause the server device to obtain the additional information related to the physical environment, cause the server device to:
- send, to each user device of the one or more other user devices, a request;
- receive, based on sending the request and from at least one of the one or more other user devices, one or more responses; and
- process the one or more responses to determine the additional information related to the physical environment.

12. The non-transitory computer-readable medium of claim 8, wherein the one or more instructions, that cause the server device to generate the threat determination information associated with the physical environment, cause the server device to:
- identify, based on the additional information related to the physical environment, one or more additional threat scores associated with the potential threat; and process the threat score associated with the potential threat and the one or more additional threat scores associated with the potential threat to generate the threat determination information associated with the physical environment.

13. The non-transitory computer-readable medium of claim 8, wherein the one or more instructions, that cause the server device to generate the threat determination information associated with the physical environment, cause the server device to:
   identify, based on the additional information related to the physical environment, additional sensor data related to the physical environment;
   process, using a first machine learning model, the sensor data and the additional sensor data to determine whether an actual threat exists in the physical environment;
   process, using a second machine learning model and based on determining whether the actual threat exists in the physical environment, the sensor data and the additional sensor data to determine a threat score associated with the actual threat; and
   generate, based on the determination of whether the actual threat exists in the physical environment and the threat score associated with the actual threat, the threat determination information associated with the physical environment.

14. The non-transitory computer-readable medium of claim 8, wherein the one or more instructions, that cause the server device to cause the one or more actions to be performed, cause the server device to:
   send, to an emergency response device, the threat determination information associated with the physical environment to cause dispatch of an emergency response at the physical environment.

15. The non-transitory computer-readable medium of claim 8, wherein the one or more instructions, that cause the server device to cause the one or more actions to be performed, cause the server device to:
   send, to the user device, the threat determination information associated with the physical environment to cause at least some of the threat determination information associated with the physical environment to be presented by the user device.

16. The non-transitory computer-readable medium of claim 8, wherein the one or more instructions, that cause the server device to cause the one or more actions to be performed, cause the server device to:
   send, to the user device and the one or more other user devices, the threat determination information associated with the physical environment to cause at least some of the threat determination information associated with the physical environment to be presented by the user device and the one or more other user devices.

17. A method of determining whether an actual threat exists in a physical environment, comprising:
   obtaining, by a user device, sensor data related to the physical environment;
   processing, by the user device, the sensor data to determine that a potential threat exists in the physical environment and determine a threat score associated with the potential threat, wherein the threat score indicates a combination of a likelihood that the potential threat exists, a severity of harm associated with the potential threat, and a likelihood of harm associated with the potential threat;
   determining, by the user device, that the threat score satisfies a threat score threshold;
   obtaining, by the user device and based on determining that the threat score satisfies the threat score threshold, additional information related to the physical environment;
   generating, based on the additional information related to the physical environment and at least one of the sensor data, information indicating the potential threat in the physical environment, or the threat score associated with the potential threat, threat determination information associated with the physical environment; and
   performing, based on the threat determination information associated with the physical environment, one or more actions.

18. The method of claim 17, wherein obtaining the additional information related to the physical environment comprises:
   identifying, based on the sensor data, a location associated with the physical environment;
   identifying a data structure that stores user device physical environment information;
   identifying, based on the location associated with the physical environment, one or more entries in the data structure that are associated with one or more user devices; and
   obtaining the additional information related to the physical environment from the one or more entries.

19. The method of claim 17, wherein generating the threat determination information associated with the physical environment comprises:
   identifying, based on the additional information related to the physical environment, additional sensor data related to the physical environment;
   processing, using a machine learning model, the sensor data and the additional sensor data to determine whether the actual threat exists in the physical environment; and
   generating, based on the determination of whether the actual threat exists in the physical environment, the threat determination information associated with the physical environment.

20. The method of claim 17, wherein performing the one or more actions comprises at least one of:
   causing at least some of the threat determination information associated with the physical environment to be presented by the user device; or
   causing at least some of the threat determination information associated with the physical environment to be presented by at least one other user device.

* * * * *